(12) United States Patent
Raichelgauz et al.

(10) Patent No.: US 12,479,423 B2
(45) Date of Patent: Nov. 25, 2025

(54) ENSEMBLE OF NARROW AI AGENTS FOR AUTONOMOUS EMERGENCY BREAKING

(71) Applicant: AUTOBRAINS TECHNOLOGIES LTD, Tel Aviv-Jaffa (IL)

(72) Inventors: Igal Raichelgauz, Tel Aviv (IL); Adam Harel, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 721 days.

(21) Appl. No.: 17/817,928

(22) Filed: Aug. 5, 2022

(65) Prior Publication Data

US 2023/0041279 A1    Feb. 9, 2023

Related U.S. Application Data

(60) Provisional application No. 63/203,984, filed on Aug. 5, 2021.

(51) Int. Cl.
*B60W 30/09* (2012.01)
*G06N 5/043* (2023.01)
*G06N 20/20* (2019.01)

(52) U.S. Cl.
CPC ............. *B60W 30/09* (2013.01); *G06N 5/043* (2013.01); *G06N 20/20* (2019.01); *B60W 2400/00* (2013.01)

(58) Field of Classification Search
None
See application file for complete search history.

(56) References Cited

U.S. PATENT DOCUMENTS

2018/0281788 A1\* 10/2018 Uchida ................ B60W 30/08
2022/0297728 A1\* 9/2022 Varadarajan ........... G06V 10/82

OTHER PUBLICATIONS

Yang, Yueyi, et al. "Anomaly detection for controller area network in braking control system with dynamic ensemble selection." IEEE Access 7 (2019): 95418-95429. (Year: 2019).\*
Podusenko, Albert, et al. "Comparative analysis of classifiers for classification of emergency braking of road motor vehicles." Algorithms 10.4 (2017): 129. (Year: 2017).\*

\* cited by examiner

*Primary Examiner* — Eric Nilsson
(74) *Attorney, Agent, or Firm* — RECHES PATENTS (57) ABSTRACT

A method for A method for automatic emergency braking (AEB) of a vehicle, the method may include obtaining sensed information regarding an environment of the vehicle and regarding a motion of the vehicle; determining an occurrence of current situation, based on the sensed information; selecting, based on the current situation, a selected narrow AI agent out of multiple narrow AI agents; wherein different narrow AI agents are trained, using a machine learning process, to perform AEB related decisions at different scenarios; wherein the selected narrow AI agent is associated with the occurrence of the current situation; processing, by the selected narrow AI agent, at least one out of (a) at least a first part of the sensed information, and (b) an outcome of a pre-processing of at least a second part of the sensed information; wherein the processing results in a AEB related decision; and responding to the AEB related decision, wherein the responding comprises at least one out of (a) executing the AEB related decision, and (b) suggesting executing the AEB related decision.

20 Claims, 5 Drawing Sheets

ENSEMBLE OF NARROW AI AGENTS FOR AUTONOMOUS EMERGENCY BREAKING

BACKGROUND

Autonomous emergency braking (AEB) is a collision avoidance system which engages the main braking system in automobiles when it detects an imminent collision. The detection of imminent collision is executed by perception systems that perform semantic decomposition (SD). The perception system feeds its output to a route planning module that feeds its output to an actuation module (brake/accel/steering etc).

Because route planning and actuation modules do not have access to raw sensor input, the role of perception in the architecture is to exhaustively label the raw inputs from the car's sensors, e.g. detect cars and pedestrians, segment free drivable space, recognize speed limit through road signs, and everything else in the scene that could possibly affect driving in this scene. Since so many objects/entities need to be identified and accurately localized within the scene for the AEB to properly work, the perception module tends to be a complicated computationally-intensive model.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the perception unit, narrow AI agents, AEB related decision unit may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a spanning element. A spanning element may be implemented in software or hardware. Different spanning element of a certain iteration are configured to apply different mathematical functions on the input they receive. Non-limiting examples of the mathematical functions include filtering, although other functions may be applied.

The specification and/or drawings may refer to a concept structure. A concept structure may include one or more clusters. Each cluster may include signatures and related metadata. Each reference to one or more clusters may be applicable to a reference to a concept structure.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

A situation nay be a singular location combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

A perception unit may be provided and may be preceded by the one or more sensors and/or by one or more interfaces form receiving one or more sensed information units. The perception unit may be configured to receive a sensed information unit from an I/O interface and/or from a sensor. The perception unit may be followed by multiple narrow AI agents—also referred to an ensemble of narrow AI agents.

An artificial intelligence (AI) agent may refer to an autonomous entity which acts, directing its activity towards achieving goals (i.e. it is an agent), upon an environment using observation through sensors and consequent actuators (i.e. it is intelligent). Intelligent agents may also learn or use knowledge to achieve their goals. They may be very simple or very complex. A reflex machine, such as a thermostat, is considered an example of an intelligent agent (www.wikipedia.org).

A sensed information unit may or may not be processed before reaching the perception unit. Any processing may be providing—filtering, noise reduction, and the like.

The number of narrow AI agents may, for example—exceed 100, exceed 500, exceed 1000, exceed 10,000, exceed 100,000 and the like. Larger number of narrow AI agents may provide more accurate AEB related decisions.

An AI narrow agent is narrow in the sense that it is not trained to respond to all possible (or all probable, or a majority of) AEB scenarios "covered" by the entire ensemble. For example—each AI narrow agent may be trained to output a AEB decision to a fraction (for example less than 1 percent) of the scenarios managed by the entire ensemble. A narrow AI agent may be trained to respond to only some factors or elements or parameters or variables that form a scenario.

The narrow AI agents may be of the same complexity and/or of same parameters (depth, energy consumption, technology implementation)—but at least some of the narrow AI agents may differ from each other by at least one of complexity and/or parameters.

The narrow AI agents may be trained in a supervised manner and/or non-supervised manner.

One or more narrow AI agents may be a neural network or may differ from a neural network.

The ensemble may include one or more sensors and any other entity for generating a sensed information unit and/or may receive (by an interface) one or more sensed information units from the one or more sensors.

The perception unit may process the one or more sensed information units and determine which narrow AI agents are relevant to the processing of the one or more sensed information units.

There may be provided an autonomous vehicle system that may use the perception unit to classify the observed scene into multiple coarse grained categories. The system may include an ensemble of narrow AI agents (EoN).

The perception unit may receive and/or generate anchors that once detected (by the perception unit), may affect the selection of which narrow AI agents to select. The number of anchors may be very big (for example—above 100, 500, 1000, 10,000, 20,000, 50,000, 100,000 anchors and even more).

For a given scenario (may be represented by one or more sensed information units such as but not limited to one or more images), the perception unit may detect one or more anchors.

The detected anchors may provide sufficient contextual cues to allow the perception unit to determine which are the relevant narrow AI agents.

The contextual cue may be a high-level sensed information unit context. It is high level in the sense that the determining of the contextual cue is less complex and/or requires less computational resources than performing object detection of a small object in a sensed information unit. A small object may be of a minimal size to be detected, may be, for example of a size of a few tens of pixels, may be of a size that is smaller than 0.1, 0.5, 1, 2, 3 percent of the sensed information unit, and the like. The determining of the contextual cue may not, for example, include determining the exact locations of each object in the image—including the locations of objects that appear as few tens of pixels in an image.

By searching for high-level sensed information unit context, the power consumption of the perception unit may be much lower (for example even up to two orders of magnitude lower) than the power consumption of a prior art system that is built to perform the entire process of object detection, and determining which driving operation to perform).

At least some of the power savings can be attributed to the fact the high-level sensed information unit context may not include location information, there is no need to determined whether objects of different sizes are the same type of objects, and the like.

A narrow AI agent may receive input directly from the sensors (for example—as an output of the perception module) and provides as an output a proposed behavior (desired vehicle control parameter—and desired AEB behavior—also referred to as AEB related decisions), e.g. whether to perform angle of a steering wheel, acceleration/brake signal, or control of any other aspect of driving, etc.

The outputs from the different selected narrow AI agents are fed to a AEB related decision unit (also referred to as coordinator) that outputs one or more output AEB related decisions such as one or more commands or requests or recommendations to various modules of a vehicle and/or to a driver.

The coordinator may apply any method for generating one or more output AEB related decisions such as the one or more commands and requests based on the outputs from the different selected narrow AI agents.

These methods may include arbitration, competition, selecting a response based on a risk imposed by adopting an output of a narrow AI agent, and the like.

Referring back to the perception unit—non-limiting examples of anchors are listed below:

approaching pedestrian crossing. Detecting a pedestrian on a sidewalk triggers different behavior depending on the proximity of a crossing. If the pedestrian is standing on the sidewalk next to a crossing then the car should slow down (in case the pedestrian will start crossing). Same pedestrian on a sidewalk can be safely ignored in other areas. Therefore, different narrow agents may be needed to drive through a pedestrian crossing.

Approaching a pothole on a road. This can trigger slow-down of a car or changing lanes Limited visibility and slipper road condition—can prescribe slower speed and/or larger safe distance from the car in front.

Encoded navigation signal—when crossing a junction, the narrow agent should get a signal if we are crossing this junction straight through, turning left, or right. This anchor/signal will change the meaning of what it means to "stay in lane".

Changing lanes—this anchor triggers a particular narrow agent responsible for changing the lane to the left or right.

Approaching road merging with different traffic signs—do I give a right of way or do I have a priority?

Presence of an unsafe driver in the vicinity: tailgating, erratic driving, cues of road rage can trigger changing to the rightmost lane, slowing down, and letting the dangerous car pass.

A police car follows you with emergency lights flashing: switch to the rightmost lane, then stop at a shoulder.

Car in from makes an emergency stop: activates a narrow agent that either performs emergency braking or turning to a shoulder and stopping there with lower deceleration.

The anchors may be selected, generated and/or learnt in various manners—manually, automatically, based on human tagging of inputs, based on autonomous tagging of inputs, based on manually identification, based on tagging of scenarios (e.g., approaching a roundabout, approaching a pedestrian crossing, environmental condition, existence of a road user)—in this case the corresponding desired behavior can be devised from the recorded behavior of the human driver in this situation, identifying unfamiliar or poorly predicted patterns of human driving. These patterns may suggest a world state that is not well covered by existing narrow agents therefore renders allocation of the new agent.

A narrow AI agent may be or may include a simple model (for example —a neural network) that receives raw (or pre-processed in any manner) sensor data as its input, processes it internally, and outputs a proposed behavior.

Examples of narrow AI agents are listed below:

Narrow AI agent for "stay in lane" steering behavior when not at a junction. The narrow AI agent may be a Convolutional Neural Network that maps image of the road taken by a front-facing camera to the steering angle of a vehicle.

Narrow AI agent for "stay in lane" steering behavior at a left-turn junction. Note that at a junction, "staying in lane" has a different meaning if we drive straight or turn left. The narrow agent for the left receives images from the frontal and left looking cameras and maps it into a steering angle. Depending on the definition, the information that indicates that an agent is turning left rather than driving straight through is either received as an input from the navigation block or is encoded as an "anchor". This narrow AI agent may be implemented as a CNN.

Narrow AI agent that implements the behavior of "change to the lane on the left". This narrow AI agent gets access to left-facing camera and proposes actions required to change lane, i.e., decision to when to change lane, acceleration before and during the change, and steering that implements changing the lane.

Narrow AI agent that steers when a vehicle is stopped at a red traffic light. This narrow AI agent is implemented as "if" condition and just keeps the steering angle constant.

Narrow AI agent that implements "keep the distance" logic: this narrow AI agent maps images taken from the frontal facing and backward facing cameras on to accelerate/brake signal.

Narrow AI agent that implements "give right way on pedestrian crossing"—this narrow AI agent stops if there is a pedestrian on a crossing or slows down if the pedestrian is near but not on the crossing. Uses input from the frontal facing camera and maps it onto brake/accelerate signal.

Examples of how the coordinator may process outputs from one or more narrow AI agents:

Combine independently.

Narrow AI agent responsible for steering angle that allows the car to stay in lane is mostly independent of driving speed. Thus, this agents proposed behavior can be combined independently with accelerate/brake behavior of the "keep the distance" narrow agent.

Override.

The vehicle should stay in lane but the car in front of us suddenly stopped and there is not enough braking distance to stop. Here, the desire to avoid a crush overrides the "stay in lane" behavior and we turn onto a shoulder and stop there.

Animal on the road—abandoning "stay in lane" and perform evasion maneuver.

"Modulate"

Slippery road will leave the "stay in lane" and "keep distance" behavior almost unchanged although will prescribe slower speeds and larger safe distances.

perform a risk reduction optimization.

The system is expected to be superior to the SD systems in all aspects, whether it is behavioral accuracy, model size and complexity, and computational intensity.

The perception unit may work in a more efficient manner than state of the art perception systems. State of the art perception systems analyze the scene fully, with the goal to reconstruct the scene, i.e. the focus on all details of the scene such as—the exact analysis of all agent on the road (pedestrian, car, bike, lanes, traffic signs, traffic lights, trees, obstacles etc) and their attributes (exact location, pose, distance, angle, etc). This is very power and resources consuming process—as its purpose is to generate an extensive environmental model as an input to the policy module.

A perception unit does not need to concentrate on all the details, and identify every agent—it only needs to analyze and classify the scene only in order to activate the relevant agent. This is a very light process performance-wise. The relevant agent, once activated, will analyze the relevant features of the input image.

It should be noted that even when the number of narrow AI agents is large—some may be stored in RAM and others may be saved in non-volatile memory (for example in disks, in cheap non-volatile memory, and the like)—and can be retrieved when needed.

The perception module may be very fast as it tasks is to detect anchors and based on the anchors—selecting the relevant narrow AI agents. Each narrow AI agent may also very fast, however, we have a very large number of these. Lucky, at any given point only few of them need to actually run, i.e., at any given point of time the running time is very small.

The suggested units may be executed or hosted by a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Figure 1:
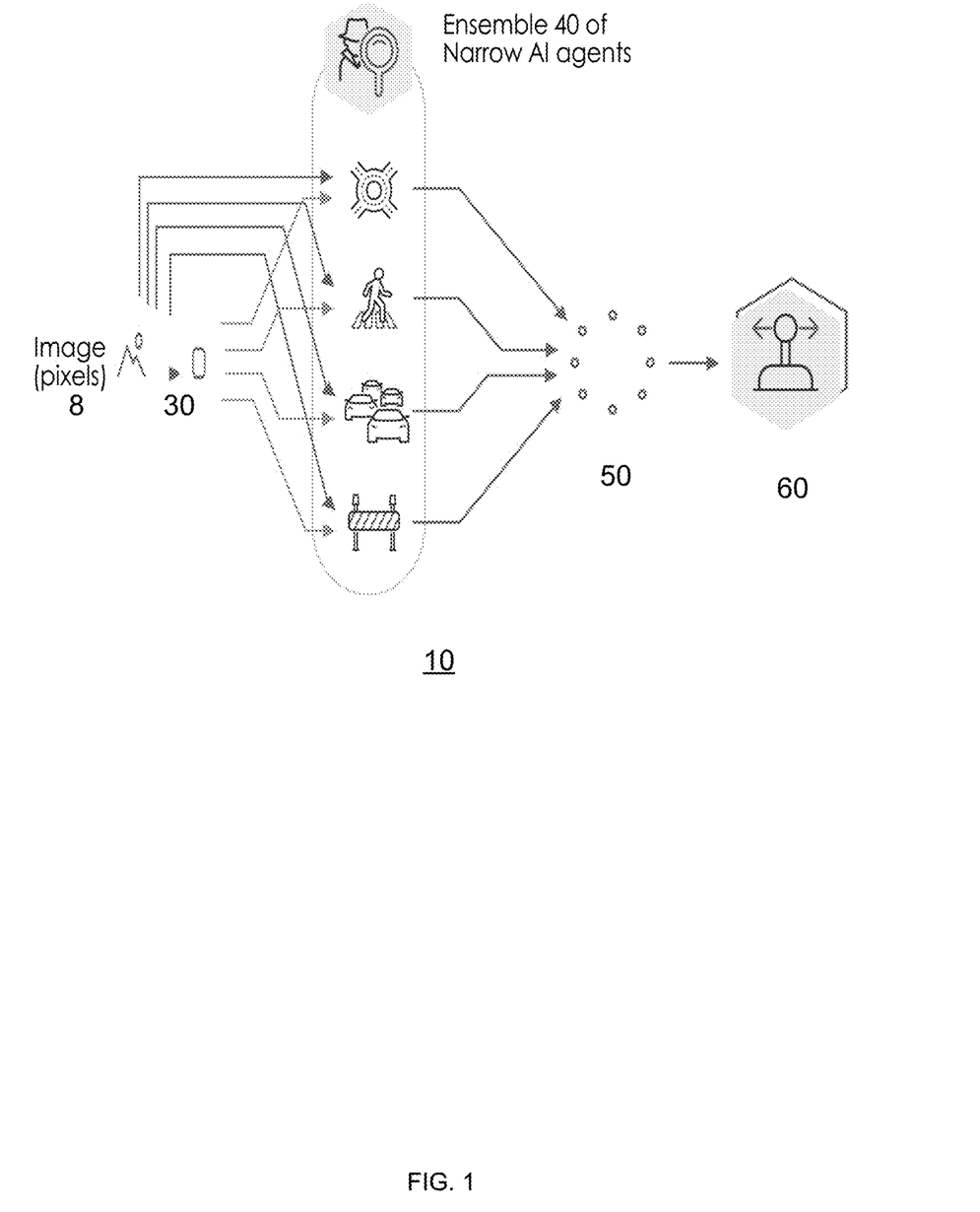
FIG. 1 illustrates an example of a system.

FIG. 1 illustrates an example of a system 10.

System 10 includes a perception unit such as perception router 30 (that receives a sensed information unit that is an image 8 with pixels), an ensemble 40 narrow AI agents (for example narrow AI agents associated with a roundabout, with a pedestrian that walks over a zebra crossing, with a certain traffic sign, or with a traffic jam), and a AEB related decision unit such as coordinator 50. The AEB related decision unit 50 may control and/or may communicate with a response unit 60.

Figure 2:
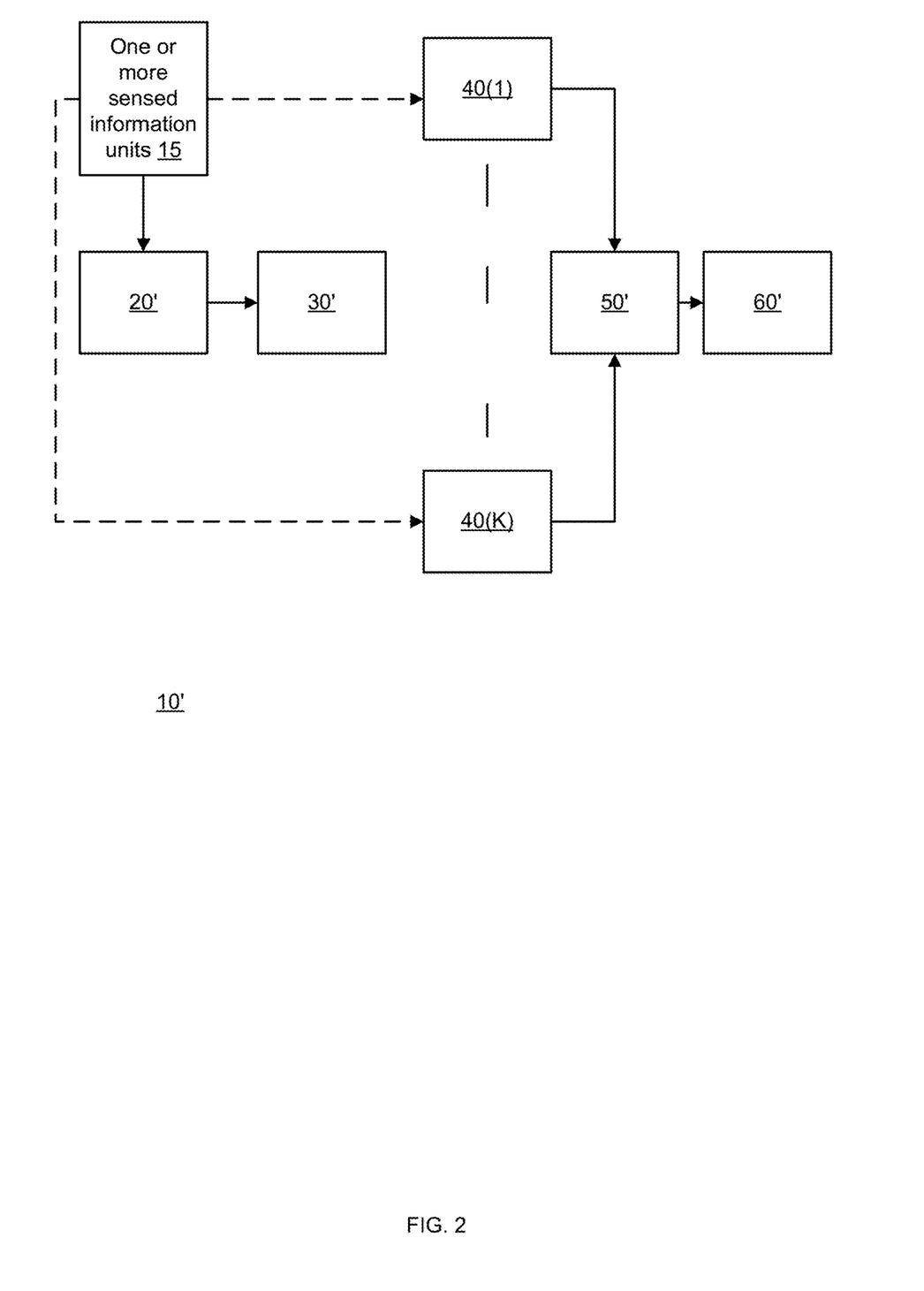
FIG. 2 illustrates an example of a system.

FIG. 2 illustrates an example of a system 10'.

System 10' includes an obtaining unit 20' (for receiving one or more sensed information units 15), a perception unit 30', narrow AI agents 40(1)-40(K), K being the number of narrow AI agents, and AEB related decision unit 50'. The AEB related decision unit may control and/or may communicate with a response unit 60' such as a brakes control system, any vehicle computer, an autonomous driving module, an ADAS driving module, and the like.

Figure 3:
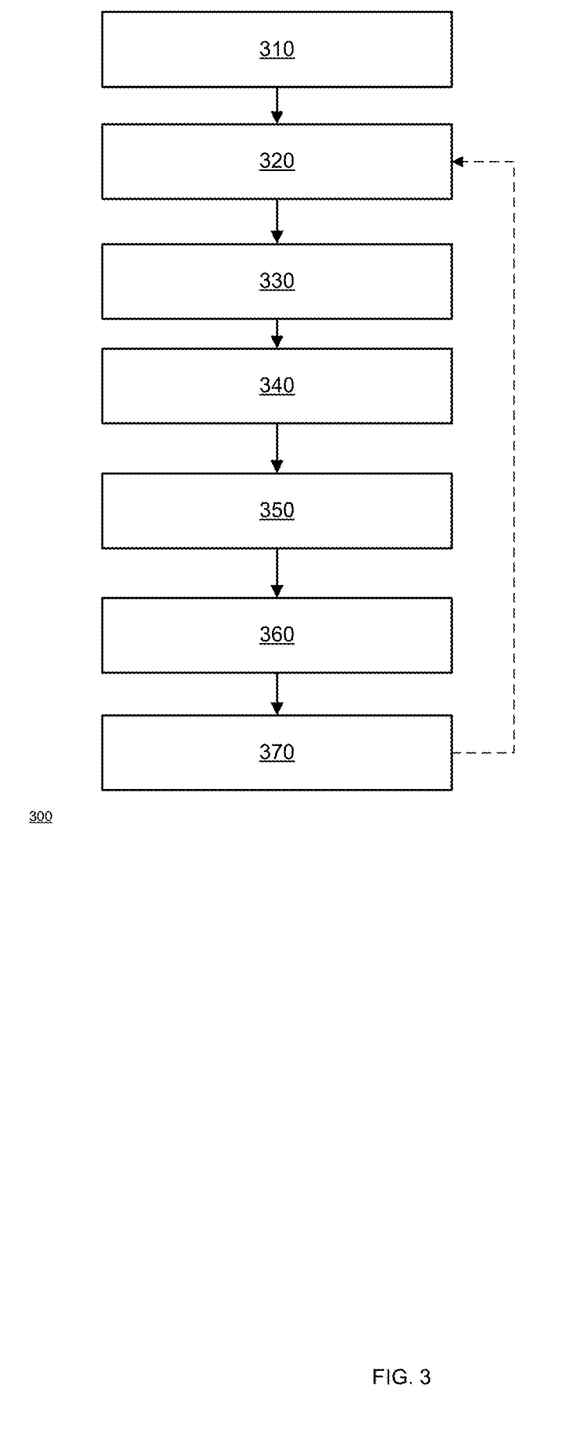
FIG. 3 illustrates an example of a method.

FIG. 3 illustrates method 300 for operating an ensemble of narrow AI agents related to an AEB of vehicle.

Related to an AEB vehicle means that the output of method 300 may be one or more AEB related decisions that may affect an AEB of the vehicle when implemented.

The method may include various steps, some may include providing desired AEB related decisions (for example during a training of any part of the entities used during method 300, the entities may include a perception unit, narrow AI agents, and a AEB related decision unit).

Additionally or alternatively, AEB related decisions associated with any of the sensed information units fed to any of the entities may be provided and the method may include determining which AEB related decisions were correct one. For example—this may be determined using statistics—for example adopting the most common AEB related decision per situation and/or scenario, or any par therein.

Method 300 may start an initialization step 310.

Step 310 may include obtaining a perception unit, narrow AI agents and a AEB related decision unit configured to execute various steps of method 300.

The obtaining may include receiving after being trained, and/or training and/or receiving at any stage of the training process, downloading instructions or otherwise configuring a computerized system to execute any other step of method 300.

Step 310 may include at least one of (a) training at least one of the perception unit, the narrow AI agents, and the AEB related decision unit, (b) receiving at least one of already trained perception unit, the narrow AI agents, and the AEB related decision unit, (c) otherwise configuring the at least one of the perception unit, the narrow AI agents, and the AEB related decision unit.

Step 310 may be followed by step 320 of obtaining one or more sensed information units.

The obtaining may include sensing, receiving without sensing, preprocessing, and the like.

Step 320 may be followed by step 330 of determining, by a perception unit and based on the one or more sensed information units, one or more relevant narrow AI agents of the ensemble that may be relevant to a processing of the one or more sensed information units. The entire ensemble may be relevant to a first plurality of scenarios.

Of the ensemble, wherein different narrow AI agents are trained, using a machine learning process, to perform AEB related decisions at different scenarios; wherein the selected narrow AI agent is associated with the occurrence of the current situation.

Each relevant narrow AI agent may be relevant to a dedicated class. The class may be associated with an anchor. Step 330 may include searching for the anchor.

Each class may be defined by at least a part of one or more scenarios, wherein the at least part of the one or more scenarios may be a fraction of the first plurality of scenarios.

The different narrow AI agents may be trained to perform AEB decisions at different scenarios that may be (or may include) a T-junction, different road elements, a zebra crossing, roundabout, obstacles, different environmental conditions, rain, fog, night, straight highway, going up the hill, traffic jam, . . . ). Example of different obstacles and/or of different road elements is illustrated in PCT patent application WO2020/079508 titled METHOD AND SYSTEM FOR OBSTACLE DETECTION which is incorporated herein in its entirety.

The different scenarios may be different situations or may differ from situations.

A scenario may be, for example at least one of (a) a location of the vehicle, (b) one or more weather conditions, (c) one or more contextual parameters, (d) a road condition, (e) a traffic parameter.

Various examples of a road condition may include the roughness of the road, the maintenance level of the road, presence of potholes or other related road obstacles, whether the road is slippery, covered with snow or other particles.

Various examples of a traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. A contextual parameter may be related to the context of the sensed information-context may be depending on or relating to the circumstances that form the setting for an event, statement, or idea.

A relevant narrow AI agent may be trained to respond to one or more situations out of a much large number of situations. Examples of situations and situation based processing are illustrated in U.S. patent application Ser. No. 16/035,732 which is incorporated herein by reference.

Each class may be defined by an anchor that may be a contextual cue. Step 320 may be executed without detection of objects that may be below a predefined number of pixels. The predefined number of pixels does not exceed few tens of pixels.

The narrow AI agents may be end-to-end narrow AI agents.

For at least some of the narrow AI agents, the respective fraction may be smaller than one percent of the first plurality of scenarios.

Step 330 may be followed by step 340 of sending the one or more sensed information units to the relevant narrow AI agents.

A relevant narrow AI agent may receive at least one out of (a) at least a first part of the sensed information, and (b) an outcome of a pre-processing of at least a second part of the sensed information.

It should be noted that once the one or more relevant narrow AI agents are determined they may be uploaded to a processor and/or a memory unit. This reduces the RAM or other memory resources required to store and execute step 350.

Step 340 (or method 300) may include maintaining at least one irrelevant narrow AI agent in a low power mode (idle, inactivated, in sleep mode, partially operational, and the like) in which a power consumption of the at least one irrelevant narrow AI agent may be lower than a power consumption of a relevant narrow AI agent.

Step 340 may be followed by step 350 of processing the one or more sensed information units, by the one or more relevant narrow AI agents, to provide one or more narrow AI agent AEB related decisions. Each narrow AI agent may be relevant to a respective fraction of the first plurality of scenarios managed by the entire ensemble.

A narrow AI agent AEB related decision may be a command, a request, or a recommendation for autonomously controlling a vehicle.

A narrow AI agent AEB related decision may be an advanced driver-assistance systems (ADAS) command, an ADAS request, or an ADAS recommendation.

Step 350 may include, for example, processing, by the selected narrow AI agent, at least one out of (a) at least a first part of the sensed information, and (b) an outcome of a pre-processing of at least a second part of the sensed information; wherein the processing results in a AEB related decision.

The outcome of the pre-processing of the at least second part of the sensed information may include road user location and behavioral information.

The road users location and behavioral information may be represented by compact contextual signatures of the road users.

The determining of the occurrence of the current situation may include generating a current situation signature.

Examples of signatures are illustrated in PCT patent application WO2020/079508 titled METHOD AND SYSTEM FOR OBSTACLE DETECTION which is incorporated herein in its entirety.

The outcome of the pre-processing of the at least second part of the sensed information may be a current situation signature.

The outcome of the pre-processing of the at least second part of the sensed information may differ from the current situation signature.

Step 350 may be followed by step 360 of processing, by a AEB related decision unit, the one or more narrow AI agent AEB related decisions to provide an output AEB related decision.

Step 360 may include averaging the one or more narrow AI agent AEB related decisions, or applying one or more functions (for example—predefined and/or learnt and/or change over time), and/or applying one or more policies on the one or more narrow AI agent AEB related decisions. An example of a policy—attempting to reduce risk—for example in case of two narrow AI agents AEB related decision of different speeds —selecting the lower speed.

Step 360 may be followed by step 370 of responding to the AEB related decision, wherein the responding may include at least one out of (a) executing the AEB related decision, and (b) suggesting executing the AEB related decision.

Method 300—especially steps 320-370 may be repeated multiple times—for example multiple times a second, once a second, one per a few seconds, continuously or non-continuously.

Figure 4:
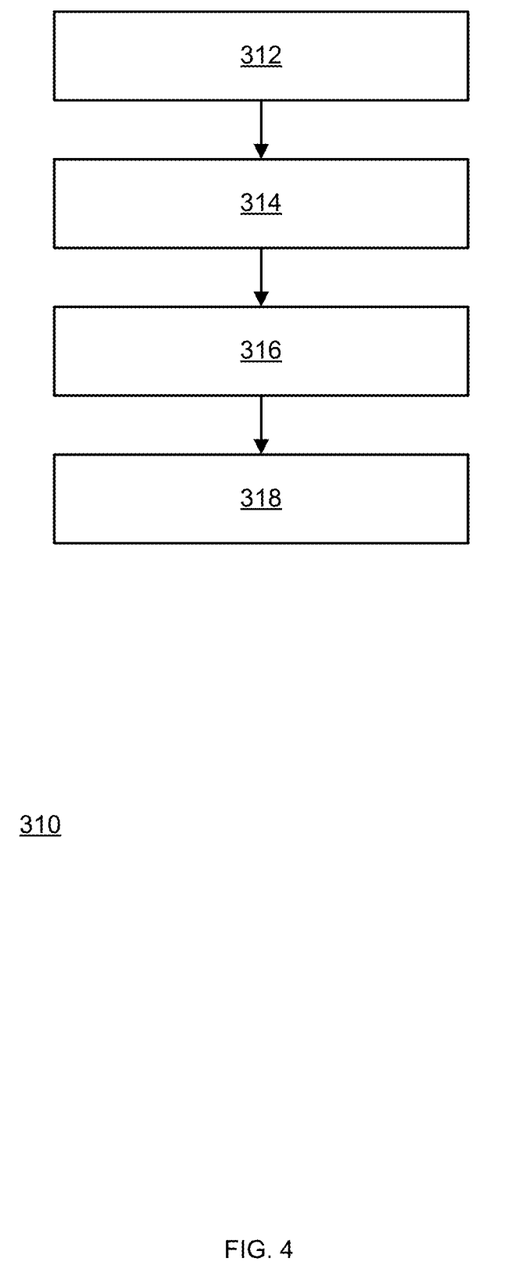
FIG. 4 illustrates an example of a method.

FIG. 4 illustrates an example of step 310.

Step 310 may include step 312 of training the perception unit to classify sensed information units to classes.

Each class may be at least a part of one or more scenarios, the one or more scenarios may be a fraction of the first plurality of scenarios.

Each class may be associated by an anchor. The anchor may be used to classify a sensed information unit to the class.

Step 312 may include receiving, by the perception unit a definition of at least some of the classes before training. This may include, for example, receiving labels or any other class defining information.

Step 312 may include defining, by the perception unit at least some of the classes.

The defining may include, for example generating signatures, and clustering the signatures to concept structures such as clusters. The clustering virtually define the classes.

The clusters may all belong to the same level or may be arranged in a hierarchical manner. The clustering, inherently, may be responsive to the statistics of the contextual cues—more frequently occurring contexts may be segmented to more clusters. Larger clusters may be split to clusters of lower level—in any manner—for example by cross correlation between cluster members, by finding shared signatures portions and unique signature portions, and the like.

Step 312 may include performing an unsupervised training.

At least part of one or more scenarios may be at least one out of (a) one or more factors of a scenario, (b) one or more element of a scenario, (c) one or more parameters of a scenario, and (d) one or more variables of a scenario.

Step 312 may be include feeding the perception unit with a first dataset of sensed information units.

Step 312 may be followed by step 314 of using the trained perception unit to classify sensed information units of a second dataset. There sensed information units are referred to as second sensed information units.

Step 314 may also include feeding one or more AEB related decision per class.

Each class will include multiple second sensed information units and one or more AEB related decision.

Each narrow AI agent may be associated with a dedicated class. Step 314 may be followed by step 316 of training each narrow AI agent to output a narrow AI agent AEB related decision associated with the dedicated class.

The training of step 316 may include feeding a narrow AI agent associated with a given class with second sensed information and one or more AEB related decisions of the class.

Step 316 may be executed in a supervised or non-supervised manner. A supervised training may include providing one or more AEB related decision as the requested output of the narrow AI agent.

Step 316 may be followed by step 318 of training the AEB related decision unit to provide an output AEB related decision based on one or more narrow AI agent AEB related decisions.

Step 318 may include feeding sensed information units of the third dataset (hereinafter third sensed information units) to the perception unit, allowing the perception unit to determine the relevant narrow AI classes (based on the classes of the third sensed information units), allow the relevant narrow AI classes to output narrow AI agent AEB related decisions and feed the AEB related decision unit with the narrow AI agent AEB related decisions and AEB related decisions associated with the third dataset.

Each one or the first, second, and third datasets may include any number of sensed information unit, may be generated in any manner. They may include randomly selected sensed information unit- or any combination of sensed information units.

Instead of determining, by a perception unit, one or more relevant (or selected) narrow AI agents—there may be provide a method in which multiple narrow AI agents are fed with inputs—without selecting the relevant narrow AI decisions.

Figure 5:
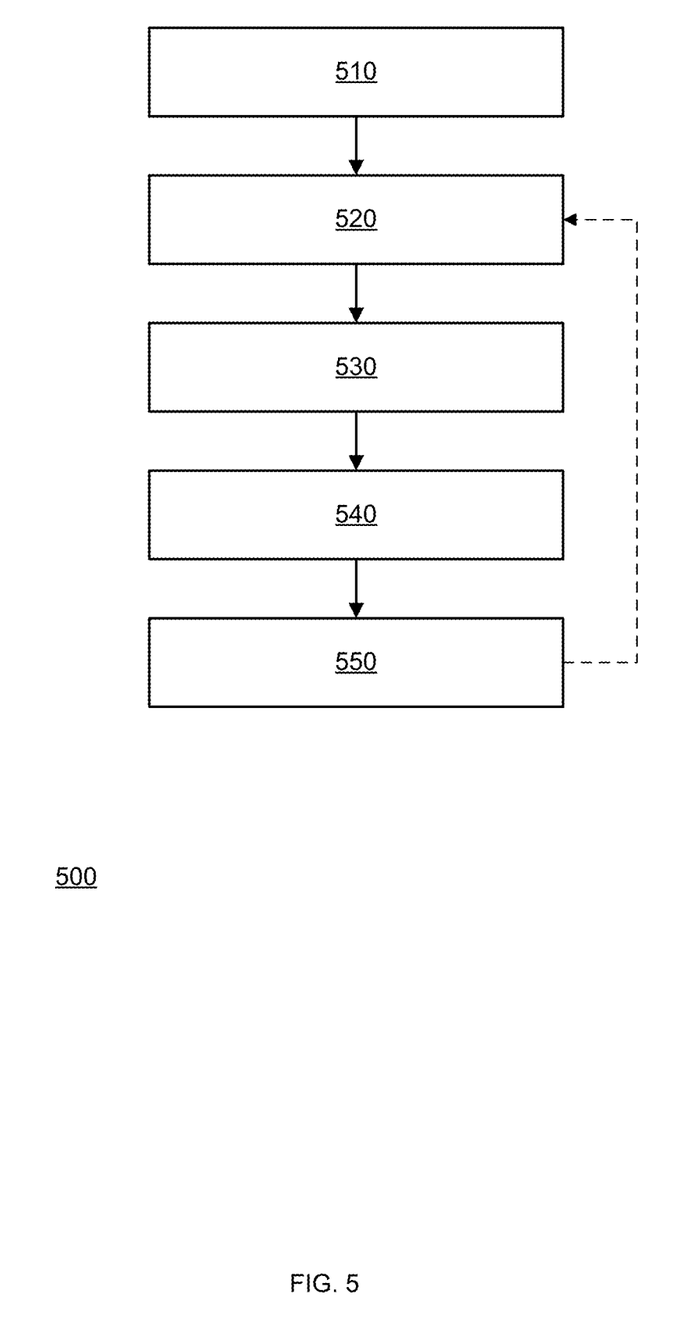
FIG. 5 illustrates an example of a method.

FIG. 5 illustrates an example of method 500.

Method 500 may include step 510 of obtaining sensed information regarding an environment of the vehicle and regarding a motion of the vehicle.

Step 510 may be followed by step 520 of feeding, to multiple narrow artificial intelligence (AI) agents, intermediate information; wherein different narrow AI agents are trained, using a machine learning process, to perform AEB related decisions at different scenarios; wherein the intermediate information comprises at least one out of (a) at least a first part of the sensed information, and (b) an outcome of a pre-processing of at least a second part of the sensed information.

Step 520 may be followed by step 530 of processing the intermediate information units by the multiple AI agents to provide one or more narrow AI agent AEB related decisions.

Step 530 may be followed by step 540 of processing, by a decision unit, the one or more narrow AI agent AEB related decisions to provide an output AEB related decision.

Step 540 may be followed by step 550 of responding to the AEB related decision, wherein the responding may include at least one out of (a) executing the AEB related decision, and (b) suggesting executing the AEB related decision.

Method 300—especially steps 520-550 may be repeated multiple times—for example multiple times a second, once a second, one per a few seconds, continuously or non-continuously.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof

What is claimed is:

1. A method for automatic emergency braking (AEB) of a vehicle, the method comprises:
obtaining sensed information regarding an environment of the vehicle and regarding a motion of the vehicle;
determining, by a perception router implemented by one or more integrated circuits, an occurrence of current situation, based on the sensed information; wherein the determining comprises finding one or more anchors that provide one or more contextual cues, wherein the occurrence of the current situation determined based on the one or more contextual cues;
selecting, based on the current situation, a selected narrow AI agent out of multiple narrow AI agents; wherein different narrow AI agents are trained, using a machine learning process, to perform AEB related decisions at different scenarios; wherein the selected narrow AI agent is associated with the occurrence of the current situation;
processing, by the selected narrow AI agent, at least one out of (a) at least a first part of the sensed information, and (b) an outcome of a pre-processing of at least a second part of the sensed information; wherein the processing results in an AEB related decision that is a command for controlling at least one of an angle of a steering wheel of the vehicle, or an acceleration or a deceleration of the vehicle; and
responding to the AEB related decision, wherein the responding comprises executing the AEB related decision.

2. The method according to claim 1 wherein the finding of the anchors consumes less power than performing object detection of objects of a size of tens of pixels.

3. The method according to claim 1 wherein the outcome of the pre-processing of the at least second part of the sensed information comprises road user location and behavioral information.

4. The method according to claim 1, wherein finding of the anchors consumes less power than performing object detection of objects of a size that is less than three percent that a size of an image that captured the anchors.

5. The method according to claim 1 wherein the determining of the occurrence of the current situation comprises generating a current situation signature.

6. The method according to claim 5 wherein the outcome of the pre-processing of the at least second part of the sensed information is the current situation signature.

7. The method according to claim 5 wherein the outcome of the pre-processing of the at least second part of the sensed information differs from the current situation signature.

8. The method according to claim 1 wherein the finding of the one or more anchors is executed without determining a location of the anchors.

9. The method according to claim 1 further comprising:
determining, by the perception unit, an occurrence of another current situation in parallel to the occurrence to the current situation, based on the sensed information;
selecting, based on the other current situation, another selected narrow AI agent out of multiple narrow AI agents;
processing, by the other selected narrow AI agent, the at least one out of (a) the at least first part of the sensed information, and (b) the outcome of the pre-processing of the at least second part of the sensed information; wherein the processing results in another AEB related decision that is another command for controlling the at least one of the angle of the steering wheel of the vehicle, or the acceleration or the deceleration of the vehicle;
generating, by an AEB related decision unit and based on the AEB related decision and the other AEB related decision, an output AEB driving related decision; and
wherein the responding comprises responding to the output AEB driving related decision.

10. The method according to claim 9, wherein the generating of the output AEB driving related decision comprises overriding one of the AEB related decision and the other AEB related decision.

11. The method according to claim 1 wherein the AEB related decision is the command for controlling the at least one of the angle of the steering wheel of the vehicle, or the acceleration or the deceleration of the vehicle; and wherein the executing of the AEB related decision comprises controlling the at least one of the angle of the steering wheel of the vehicle, or the acceleration or the deceleration of the vehicle.

12. A non-transitory computer readable medium that stores instructions for operating an ensemble of narrow AI agents, the operating comprises:
obtaining one or more sensed information units;
determining, by a perception router implemented by one or more integrated circuits, and based on the one or more sensed information units, one or more relevant narrow AI agents of the ensemble that are relevant to a processing of the one or more sensed information units; wherein the ensemble is relevant to a first plurality of scenarios; wherein the determining comprises finding one or more anchors that provide one or more contextual cues, wherein the relevant narrow AI agents are determined based on the one or more contextual cures;
processing the one or more sensed information units, by the one or more relevant narrow AI agents, to provide one or more narrow AI agent AEB related decisions; wherein each narrow AI agent is relevant to a respective fraction of the first plurality of scenarios; and
processing, by a AEB related decision unit, the one or more narrow AI agent AEB related decisions to provide an output AEB related decision that is a command for controlling at least one of an angle of a steering wheel of the vehicle, or an acceleration or a deceleration of the vehicle; and
responding to the output AEB related decision, wherein the responding comprises executing the output AEB related decision.

13. The non-transitory computer readable medium according to claim 12 wherein the finding of the anchors consumes less power than performing object detection of objects of a size of tens of pixels.

14. The non-transitory computer readable medium according to claim 12 wherein the outcome of the pre-processing of the at least second part of the sensed information comprises road user location and behavioral information.

15. The non-transitory computer readable medium according to claim 12 wherein the determining of the occurrence of the current situation comprises generating a current situation signature.

16. The non-transitory computer readable medium according to claim 15 wherein the finding of the anchors consumes less power than performing object detection of objects of a size that is less than three percent that a size of an image that captured the anchors.

17. The non-transitory computer readable medium according to claim 15 wherein the outcome of the pre-processing of the at least second part of the sensed information is the current situation signature.

18. The non-transitory computer readable medium according to claim 15 wherein the outcome of the pre-processing of the at least second part of the sensed information differs from the current situation signature.

19. The non-transitory computer readable medium according to claim 12 wherein the finding of the one or more anchors is executed without determining a location of the anchors.

20. A non-transitory computer readable medium that stores instructions for operating an ensemble of narrow AI agents, the operating comprises:

obtaining sensed information regarding an environment of the vehicle and regarding a motion of the vehicle;

feeding, to multiple narrow artificial intelligence (AI) agents, intermediate information; wherein different narrow AI agents are trained, using a machine learning process, to perform AEB related decisions at different scenarios; wherein the intermediate information comprises at least one out of (a) at least a first part of the sensed information, and (b) an outcome of a pre-processing of at least a second part of the sensed information;

processing the intermediate information units by the multiple AI agents to provide one or more narrow AI agent AEB related decisions; and processing, by a decision unit, the one or more narrow AI agent AEB related decisions to provide an output AEB related decision that is a command for controlling at least one of an angle of a steering wheel of the vehicle, or an acceleration or a deceleration of the vehicle; and responding to the output AEB related decision, wherein the responding comprises executing the output AEB related decision.

* * * * *